(12) United States Patent
Manda et al.

(10) Patent No.: US 11,551,261 B2
(45) Date of Patent: Jan. 10, 2023

(54) METHODS AND APPARATUS FOR ELECTRONICALLY DETERMINING ITEM ADVERTISEMENT RECOMMENDATIONS

(71) Applicant: Walmart Apollo, LLC, Bentonville, AR (US)

(72) Inventors: Rajagopal Manda, Newark, CA (US); Kaushiki Nag, Sunnyvale, CA (US); Shirpaa Manoharan, Sunnyvale, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/708,832

(22) Filed: Mar. 30, 2022

(65) Prior Publication Data

US 2022/0222701 A1    Jul. 14, 2022

Related U.S. Application Data

(63) Continuation of application No. 16/730,489, filed on Dec. 30, 2019, now Pat. No. 11,341,528.

(51) Int. Cl.
*G06Q 30/00* (2012.01)
*G06Q 30/02* (2012.01)
*G06Q 30/06* (2012.01)

(52) U.S. Cl.
CPC ..... *G06Q 30/0253* (2013.01); *G06Q 30/0631* (2013.01)

(58) Field of Classification Search
None
See application file for complete search history.

(56) References Cited

U.S. PATENT DOCUMENTS 7,558,787 B2   7/2009  Parikh
8,019,642 B2   9/2011  Selinger et al.
(Continued)

OTHER PUBLICATIONS

Jorge Martinez-Gil, An overview of textual semantic similarity measures based on web intelligence, Artificial Intelligence Review, Springer Verlag, 2012, 42 (4), pp. 935-943. (10.1007/s 10462-012-9349-8. hal-01630890) dated 2012, downloaded from https:// hal .archives-ouvertes.fr/hal-01630890/document (Year: 2012).

(Continued)

*Primary Examiner* — Alvin L Brown
(74) *Attorney, Agent, or Firm* — Morgan, Lewis & Bockius LLP; Manita Rawat (57) ABSTRACT

This application relates to apparatus and methods for automatically determining and providing, for a given anchor item, a ranking of items. The ranking may include sponsored items. In some examples, a computing device receives a request for items for an anchor item. The computing device determines a relevancy of a plurality of recommended items and sponsored items. The computing device also determines a cost value for the sponsored items. The computing device determines ranking values for the plurality of recommended items and sponsored items based on the relevancy values and the cost values, and ranks the items based on the ranking values. In some examples, the computing device updates the final item ranking based on the application of one or more rules. The computing device transmits the final item ranking to a web server. The web server displays advertisements for the items in ranked order.

20 Claims, 7 Drawing Sheets

(56) References Cited

U.S. PATENT DOCUMENTS

| | | |
|---|---|---|
| 8,108,329 B2 | 1/2012 | Selinger et al. |
| 8,117,216 B1 | 2/2012 | Chanda et al. |
| 8,364,528 B2 | 1/2013 | Selinger et al. |
| 8,392,429 B1 | 3/2013 | Clancy et al. |
| 8,473,349 B1 | 6/2013 | Manber et al. |
| 8,554,629 B2 | 10/2013 | Barton et al. |
| 8,583,524 B2 | 11/2013 | Selinger et al. |
| 8,615,442 B1 | 12/2013 | Kapur et al. |
| 8,924,265 B2 | 12/2014 | Selinger et al. |
| 9,009,154 B2 | 4/2015 | Rinckles et al. |
| 9,734,503 B1 | 8/2017 | Gargi |
| 10,007,946 B1 | 6/2018 | Levy et al. |
| 10,318,993 B2 | 6/2019 | Baghaie et al. |
| 10,521,831 B2 | 12/2019 | Putrevu et al. |
| 10,706,450 B1 | 7/2020 | Tavernier et al. |
| 10,902,341 B1 | 1/2021 | Qureshi |
| 2005/0222987 A1 | 10/2005 | Vadon |
| 2007/0038614 A1 | 2/2007 | Guha |
| 2007/0083611 A1 | 4/2007 | Farago et al. |
| 2007/0240207 A1 | 10/2007 | Belakhdar et al. |
| 2008/0235085 A1 | 9/2008 | Kovinsky et al. |
| 2008/0243816 A1 | 10/2008 | Chan et al. |
| 2009/0228277 A1 | 9/2009 | Bonforte et al. |
| 2009/0259632 A1 | 10/2009 | Singh |
| 2010/0138452 A1 | 6/2010 | Henkin et al. |
| 2011/0078127 A1 | 3/2011 | Lin et al. |
| 2011/0238478 A1 | 9/2011 | Gottfurcht et al. |
| 2012/0012406 A1 | 1/2012 | Stoicoviciu |
| 2013/0166303 A1 | 6/2013 | Chang et al. |
| 2013/0211879 A1 | 8/2013 | Holland |
| 2013/0211925 A1 | 8/2013 | Holland |
| 2013/0290117 A1 | 10/2013 | Urban |
| 2013/0315475 A1 | 11/2013 | Song et al. |
| 2014/0180790 A1 | 6/2014 | Boal |
| 2014/0180793 A1 | 6/2014 | Boal |
| 2014/0180802 A1 | 6/2014 | Boal |
| 2014/0180806 A1 | 6/2014 | Boal |
| 2014/0180807 A1 | 6/2014 | Boal |
| 2014/0180808 A1 | 6/2014 | Boal |
| 2014/0180809 A1 | 6/2014 | Boal |
| 2014/0180810 A1 | 6/2014 | Boal |
| 2014/0180811 A1 | 6/2014 | Boal |
| 2016/0225015 A1 | 8/2016 | Subramanya et al. |
| 2017/0090867 A1 | 3/2017 | Lifar et al. |
| 2017/0097490 A1 | 4/2017 | Chen et al. |
| 2017/0097940 A1 | 4/2017 | Panuganty |
| 2017/0262899 A1 | 9/2017 | Geraghty et al. |
| 2018/0060908 A1 | 3/2018 | Kenthapadi |
| 2018/0075512 A1 | 3/2018 | Bui et al. |
| 2018/0218428 A1 | 8/2018 | Xie et al. |
| 2019/0163748 A1 | 5/2019 | Zhivotvorev et al. |
| 2019/0266285 A1 | 8/2019 | Wang et al. |
| 2019/0347347 A1 | 11/2019 | Griffith |
| 2020/0005347 A1 | 1/2020 | Boal |
| 2020/0104898 A1 | 4/2020 | Cui et al. |
| 2020/0285944 A1 | 9/2020 | Lee et al. |
| 2021/0012406 A1 | 1/2021 | Wadhwa et al. |
| 2021/0073891 A1 | 3/2021 | Al Jadda et al. |

OTHER PUBLICATIONS

Brownlee, Jason, What Are Word Embeddings for Text?, dated Oct. 11, 2017, downloaded Jul. 2, 2021 from https://machinelearningmastery.com/what-are-word-embeddings/.

Karani, Dhruvil, Introduction to Word Embeddings and Word2Vec, dated Sep. 1, 2018, downloaded Jul. 2, 2021 from https://towardsdatascience.com/introduction-to-word-embedding-and-word2vec-652d0c2060fa.

Deng, Houtao, Recommender Systems in Practice—How companies make product recommendations, dated Feb. 13, 2019, downloaded Jul. 2, 2021 from https://towardsdatascience.com/recommender-systems-in-practice-cef9033bb23a.

Foote, Keith D., A Brief History of Machine Learning, dated Mar. 26, 2019, downloaded from https://www.dataversity.net/ a-brief-history-of-machine-learning/# on Apr. 13, 2021.

Maruti Techlabs, What are Product Recommendation Engines? And the various versions of them?, dated Sep. 28, 2017, downloaded Oct. 8, 2021 from https://towardsdatascience.com/ what-are-product-recommendation-engi nes-and-the-vari ous-versi ons-of-them-9dcab4ee26d5 (Year: 2017).

Contextual searching, from Wikipedia, dated Sep. 27, 2018, from https://en.wikipedia.org/w/index.php?title=Contextual_searching&oldid=861390169, downloaded Jan. 20, 2022.

Pandu Nayak, "Understanding Searches Better Than Ever Before," https://blog.google/products/search/search-anguage-understand-bert/, Oct. 25, 2019, 8 pages.

Bill Slawski, "How a Search Engine Might Determine Search Engine Relevance from Related Queries," SEO by the Sea, https://www.seobythesea.com/2009/07/how-a-search-engine-might-determine-the-relevance-of-search-results-from-related-queries/, Jul. 22, 2009, 23 pages.

METHODS AND APPARATUS FOR ELECTRONICALLY DETERMINING ITEM ADVERTISEMENT RECOMMENDATIONS

CROSS-REFERENCE TO RELATED APPLICATIONS

This application is a continuation of, and claims priority to, U.S. patent application Ser. No. 16/730,489, filed on Dec. 30, 2019 and entitled "METHODS AND APPARATUS FOR ELECTRONICALLY DETERMINING ITEM ADVERTISEMENT RECOMMENDATIONS," and which is hereby incorporated by reference in its entirety.

TECHNICAL FIELD

The disclosure relates generally to digital advertisements and, more specifically, to electronically determining and providing item advertisement recommendations.

BACKGROUND

At least some websites, such as retailer websites, display item advertisements. The item advertisements may include an image of an item, and a price of the item. For example, a website may display item advertisements, and may further allow a customer to click on the advertisement. The website may also allow the customer to purchase the advertised items. In some examples, websites advertise items sponsored by advertisers. The advertisers may pay a cost to the retailers when a customer clicks on a sponsored item advertisement. In some examples, the displayed advertisements are provided by advertisement recommendation systems.

At least some item advertisements, however, may be for items that are irrelevant to a customer, or for items the customer is not interested in. As a result, a retailer may lose sales of items to a customer. For example, the customer may not buy an advertised item, and may leave the website without having purchased an item that, if shown an advertisement for, the customer would have purchased. In some examples, if a customer perceives an advertisement as irrelevant, the customer may go elsewhere, such as another website, to make a purchase. In addition, if a customer is not interested in an advertisement, such as a sponsored advertisement, the customer may not click on the advertisement. As such, there are opportunities to address item advertisements.

SUMMARY

The embodiments described herein are directed to automatically determining and providing digital item advertisements that may be displayed, for example, on a website. In some examples, the embodiments may allow for the presentation of advertisements that are more relevant to a webpage being viewed by a customer. For example, the embodiments may allow for the display of advertisements for items that are more relevant to an anchor item being viewed. In some examples, the embodiments may allow for the presentation of advertisements for sponsored items that are relevant to the webpage being viewed by the customer. For example, customers may be more interested in the items advertised, and may be more likely to engage (e.g., click) the advertisements.

As such, by providing more relevant item advertisements, the embodiments may allow for an improved customer experience with shopping on a website. In addition, because a person may now spend less time reviewing irrelevant advertisements, the person may have additional time to consider additional items for purchase. Moreover, in some examples, the embodiments may allow a retailer to increase revenue from customer engagement of the advertisements (e.g., the clicking of advertisements). In some examples, the embodiments may allow a retailer to increase item advertisement conversions (e.g., an amount of advertised items sold). In addition to or instead of these example advantages, persons of ordinary skill in the art having the benefit of these disclosures may recognize and appreciate other advantages as well.

In accordance with various embodiments, exemplary systems may be implemented in any suitable hardware or hardware and software, such as in any suitable computing device. In some embodiments, a computing device automatically determines and provides, for a given anchor item, a ranking of items. The ranking may include sponsored items. For example, a computing device can receive a request for items for an anchor item from, for example, a web server. The computing device can determine a relevancy of a plurality of recommended items and sponsored items. The computing device can also determines a cost value for the sponsored items. Further, the computing device can determine ranking values for the plurality of recommended items and sponsored items based on the relevancy values and the cost values, and ranks the items based on the ranking values. In some examples, the computing device updates the final item ranking based on the application of one or more rules. The computing device can transmit the final item ranking, such as to a web server. The web server can then display advertisements for the items in ranked order.

In some embodiments, a computing device is configured to obtain, for an anchor item, a plurality of recommended items. The computing device may be configured to determine a first relevance value for each of the plurality of recommended items. The computing device may also be configured to obtain a plurality of sponsored items, and determine a second relevance value for each of the plurality of sponsored items based on a relevancy to the anchor item. The computing device may further be configured to determine a ranking of the plurality of recommended items and at least a portion of the plurality of sponsored items based on the first relevance value for each of the plurality of recommended items and the second relevance value for each of the plurality of sponsored items. In some examples, the computing device determines a cost value for the sponsored items, and determines the ranking of the sponsored items based on the second relevance value and cost value for each of the plurality of sponsored items. The computing device may also be configured to transmit item recommendation data identifying the ranking of the plurality of recommended items and the portion of the plurality of sponsored items. For example, the computing device may transmit the item recommendation data to a web server that will display advertisements for the plurality of recommended items and the portion of the plurality of sponsored items.

In some embodiments, a method is provided that includes obtaining, for an anchor item, a plurality of recommended items. The method includes determining a first relevance value for each of the plurality of recommended items. The method also includes obtaining a plurality of sponsored items, and determining a second relevance value for each of the plurality of sponsored items based on a relevancy to the anchor item. The method also includes determining a ranking of the plurality of recommended items and at least a portion of the plurality of sponsored items based on the first relevance value for each of the plurality of recommended items and the second relevance value for each of the plurality of sponsored items. In some examples, the method includes determining a cost value for the sponsored items, and determining the ranking of the sponsored items based on the second relevance value and cost value for each of the plurality of sponsored items. Further, the method includes transmitting item recommendation data identifying the ranking of the plurality of recommended items and the portion of the plurality of sponsored items. For example, the item recommendation data may be transmitted to a web server that will display advertisements for the plurality of recommended items and the portion of the plurality of sponsored items.

In yet other embodiments, a non-transitory computer readable medium has instructions stored thereon, where the instructions, when executed by at least one processor, cause a computing device to perform operations that include obtaining, for an anchor item, a plurality of recommended items. The operations include determining a first relevance value for each of the plurality of recommended items. The operations also include obtaining a plurality of sponsored items, and determining a second relevance value for each of the plurality of sponsored items based on a relevancy to the anchor item. The operations also include determining a ranking of the plurality of recommended items and at least a portion of the plurality of sponsored items based on the first relevance value for each of the plurality of recommended items and the second relevance value for each of the plurality of sponsored items. In some examples, the operations include determining a cost value for the sponsored items, and determining the ranking of the sponsored items based on the second relevance value and cost value for each of the plurality of sponsored items. Further, the operations include transmitting item recommendation data identifying the ranking of the plurality of recommended items and the portion of the plurality of sponsored items. For example, the item recommendation data may be transmitted to a web server that will display advertisements for the plurality of recommended items and the portion of the plurality of sponsored items.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Figure 1:
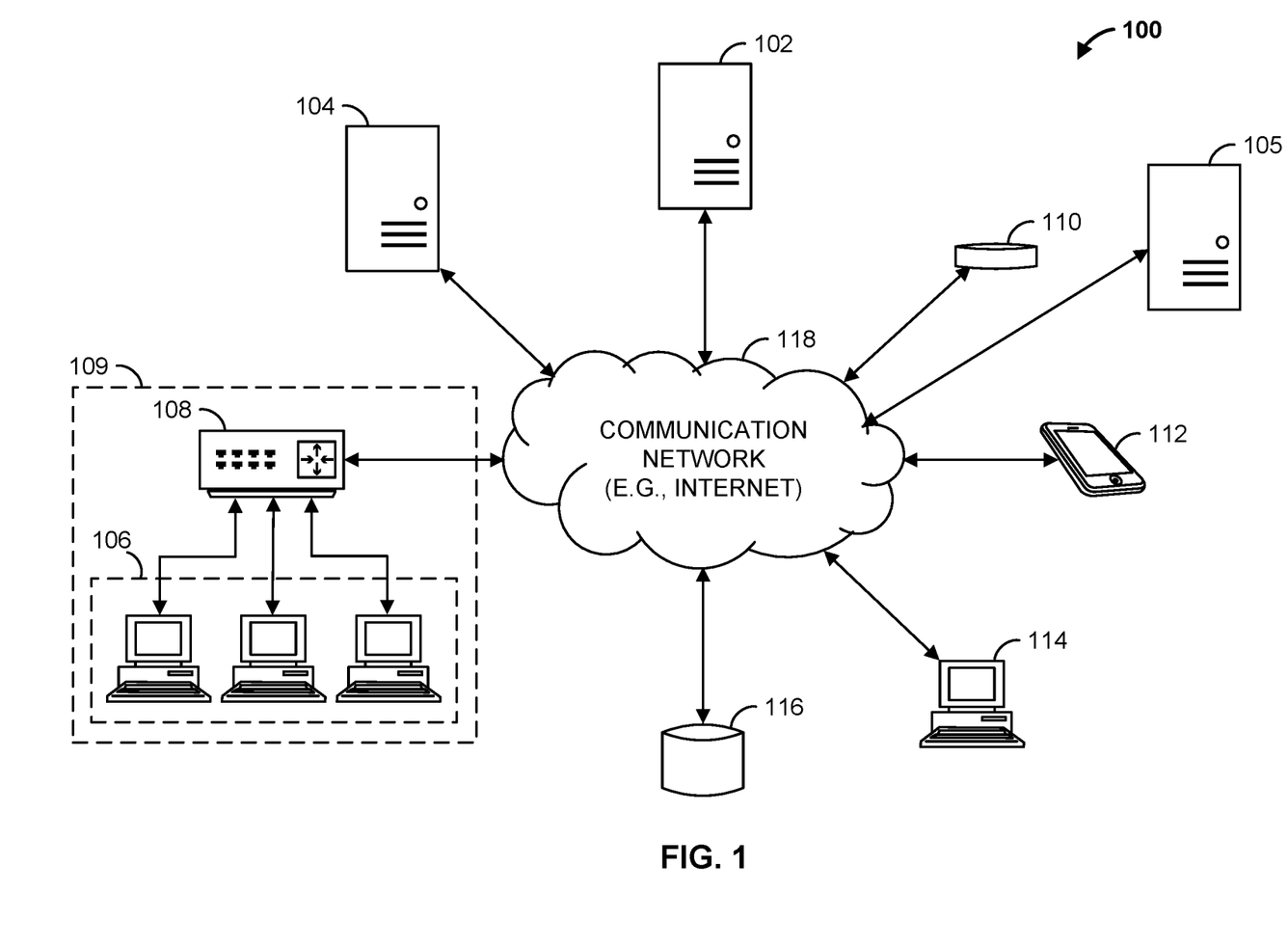
FIG. 1 is a block diagram of an item advertisement determination system in accordance with some embodiments.

Turning to the drawings, FIG. 1 illustrates a block diagram of an item advertisement determination system 100 that includes an item determination computing device 102 (e.g., a server, such as an application server), a web server 104, an item recommendation system 105, workstation(s) 106, database 116, and multiple customer computing devices 110, 112, 114 operatively coupled over network 118. Item determination computing device 102, workstation(s) 106, web server 104, item recommendation system 105, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, item determination computing device 102 can be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, item determination computing device 102 is operated by a retailer, and multiple customer computing devices 112, 114 are operated by customers of the retailer.

Although FIG. 1 illustrates three customer computing devices 110, 112, 114, item advertisement determination system 100 can include any number of customer computing devices 110, 112, 114. Similarly, item advertisement determination system 100 can include any number of work station(s) 106, item determination computing devices 102, web servers 104, item recommendation systems 105, and databases 116.

Item recommendation system 105 can generate recommendations of items to advertise. For example, item recommendation system 105 can be a server that generates and transmits an identification of items that recommended to be advertised. Item recommendation system 105 may transmit the item recommendations to item determination computing device 102 over communication network 118.

Workstation(s) 106 is operably coupled to communication network 118 via router (or switch) 108. Workstation(s) 106 and/or router 108 may be located at a store 109, for example. Workstation(s) 106 can communicate with item determination computing device 102 over communication network 118. The workstation(s) 106 may send data to, and receive data from, item determination computing device 102. For example, the workstation(s) 106 may transmit data related to an order purchased by a customer at store 109 to item determination computing device 102 over communication network 118. In response, item determination computing device 102 may transmit an indication of one or more item advertisements to provide to the purchasing customer. For example, the item advertisements may be displayed on a receipt handed to the customer for the purchase order.

In some examples, web server 104 may host one or more web pages, such as a retailer's website. The website may allow a customer to view and purchase items. For example, the website may display advertisements for items that a customer may purchase on the website. In some examples, item determination computing device 102 may transmit to web server 104, over communication network 118, one or more item advertisements to display on the website. For example, the item advertisements may be displayed on a checkout webpage, on a homepage, on an item (e.g., anchor item) webpage, or on a webpage dedicated to a category of the advertised item. The item advertisements may be displayed on a webpage when a customer is browsing that webpage.

In some examples, web server 104 transmits user transaction data to item determination computing device 102. User transaction data may identify, for example, purchase transactions (e.g., the purchase of items) on a website. User transaction data may include, for example, an identification of one or more items purchased (e.g., item IDs), the purchase price of each item, a purchase date, and a transaction ID, for example.

In some examples, web server 104 transmits user session data to item determination computing device 102. User session data may identify items viewed, engaged (e.g., clicked on), or purchased on a website. User session data may also identify, for example, item advertisement impressions, items added to an online shopping cart, or items purchased after an engagement on the website of an advertisement for the items. User session data may also identify any other data related to the browsing of a website.

First customer computing device 110, second customer computing device 112, and N$^{th}$ customer computing device 114 may communicate with web server 104 over communication network 118. For example, each of multiple computing devices 110, 112, 114 may be operable to view, access, and interact with webpages of a website hosted by web server 104. In some examples, web server 104 hosts a website for a retailer that allows for the purchase of items. An operator of one of multiple computing devices 110, 112, 114 may access the website hosted by web server 104, add one or more items to an online shopping cart of the website, and perform an online checkout of the shopping cart to purchase the items.

Item determination computing device 102 is operable to communicate with database 116 over communication network 118. For example, item determination computing device 102 can store data to, and read data from, database 116. Database 116 can be a remote storage device, such as a cloud-based server, a memory device on another application server, a networked computer, or any other suitable remote storage. Although shown remote to item determination computing device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Item determination computing device 102 can receive recommended items to advertise for a given anchor item. For example, item determination computing device 102 may request from item recommendation system 105 recommended items to advertise for an anchor item. In response, item determination computing device 102 may receive, from item recommendation system 105, a plurality of items that are recommended to be advertised given the anchor item. In some examples, item determination computing device 102 may also obtain sponsored items that are to be advertised. For example, a listing of sponsored items may be obtained from database 116. Each sponsored item may be associated with a "cost per click," or an amount the advertiser of the sponsored item agrees to pay a retailer for each "click" of an advertisement for the sponsored item.

Item determination computing device 102 may determine, for the given anchor item, a ranked item list that includes a subset of the recommended items and sponsored items to be advertised by web server 104. In some examples, item determination computing device 102 determines an order in which the subset of the recommended items and sponsored items are to be advertised. The items may be advertised in a recommendation carousel displayed on a webpage dedicated to an anchor item (e.g., as suggested items for purchase), for example. Item determination computing device 102 may "boost" an item recommendation received from item recommendation system 105 such that an advertisement for the item appears earlier in the carousel. Item determination computing device 102 may also "blend" a sponsored item into the recommendations received from item recommendation system 105 such that an advertisement for the sponsored item appears in the carousel.

To generate a ranked item list, item determination computing device 102 may receive user session data from web server 104 identifying a current browsing session by a customer of a webpage. The webpage may be, for example, a webpage dedicated to an item (e.g., an anchor item webpage). Based on the user session data, item determination computing device 102 may determine an anchor item (e.g., based on a URL of a webpage, impression data, etc.). In some examples, web server 104 requests items for advertisement for a particular anchor item. Item determination computing device 102 may then request and receive item recommendations for the anchor item from item recommendation system 105.

Item determination computing device 102 may determine a relevancy (e.g., relevancy score) of the item recommendations to the anchor item. In some examples, the relevancy is determined based on execution of one or more collaborative filtering algorithms, such as one based on matrix factorization, that operate on customer and item interactions. In some examples, the relevancy of the item recommendations is received from item recommendation system 105.

Item determination computing device 102 may also obtain sponsored items. For example, database 116 may store sponsored item data identifying one or more sponsored items. Each sponsored item may be associated with a cost value. The cost value may identify any cost associated with the sponsored item. For example, the cost value may be a cost-per-click value. The cost-per-click value identifies a monetary amount that an advertiser will pay the retailer for each time a customer clicks an advertisement for the sponsored item that is displayed on a webpage.

In some examples, item determination computing device 102 filters out sponsored items that are not of a same type or category as of that of the anchor item. As an example, given an anchor item of a television, the category of the television may be "electronics." As such, sponsored items that are not in the same category as "electronics" may be filtered out (e.g., removed from consideration).

Additionally or alternatively, in some examples, a similarity between each sponsored item and one or more of the anchor item, and recommended items, is determined. Sponsored items with similarities beyond (e.g., above) a threshold are kept, while sponsored items with similarities not beyond (e.g., at or below) the threshold are removed from consideration.

For example, item determination computing device 102 may determine a cosine similarity between each sponsored item and each anchor item. The cosine similarity may be based on features or properties of the sponsored item and the anchor item. As an example, item determination computing device 102 may generate a sponsored item vector (e.g., SI[ ]) identifying a title, a category, and a price of the sponsored item. Similarly, item determination computing device 102 may generate an anchor item vector (e.g., AI[ ]) identifying a title, a category, and a price of the anchor item. Item determination computing device 102 may compute a cosine similarity based on the sponsored item vector and the anchor item vector (e.g., sim_score=cosine_sim(SI[ ], AI[ ]). Item determination computing device 102 may keep only those sponsored items with similarity scores that are beyond a threshold. Sponsored items with similarity scores that are not beyond the threshold are removed from consideration.

In some examples, item determination computing device 102 determines a cosine similarity between each sponsored item and each recommended item. The cosine similarity may be based on features or properties of the sponsored item and the recommended items. As an example, item determination computing device 102 may generate a sponsored item vector (e.g., SI[ ]) identifying a title, a category, and a price of the sponsored item. Similarly, item determination computing device 102 may generate a recommended item vector (e.g., RI[ ]) identifying a title, a category, and a price of each recommended item. Item determination computing device 102 may compute a cosine similarity based on the sponsored item vector and each recommended item vector (e.g., sim_score=cosine_sim(SI[ ], AI[ ]), and determine the cosine similarity indicating the most similarity. For example, item determination computing device 102 may select the highest similarity score for the sponsored item. Item determination computing device 102 may keep only those sponsored items with a selected similarity score (e.g., highest similarity score) that is beyond (e.g., above) a threshold. Sponsored items with a selected similarity score that is not beyond (e.g., at or below) the threshold is removed from consideration.

In some examples, item determination computing device determines a relevancy (e.g., relevancy score) for each (remaining) sponsored item. The relevancy may be determined based on execution of one or more collaborative filtering algorithms, such as one based on matrix factorization, that operate on customer and item interactions. In some examples, the relevancy of sponsored items is received from item recommendation system 105. In some examples, the relevancy is adjusted based on the similarity score (e.g., final_rel=orig_rel*sim_score).

In some examples, item determination computing device 102 determines a cost-per-click score for each (remaining) sponsored item based on the cost-per-click value. In some examples, the cost-per-click score is the cost-per-click value. In some examples, the cost-per-click score is based on a cost-per-impression value (e.g., an amount an advertiser pays for each viewing of an advertisement).

In some examples, the relevancies (e.g., relevance scores) for the recommended items are normalized based on a mean and deviation of the relevance of the recommended items. Similarly, in some examples, the relevancies for the sponsored items are normalized based on a mean and deviation of the relevance of the sponsored items. For example, item determination computing device 102 may normalize the relevancies based on the equation below.

$$Z_{rel}=(S_{rel}-\mu)/\sigma \qquad (\text{eq. 1})$$

where:
  $S_{rel}$ is the relevancy for the item;
  $\mu$ is the mean (average) of the relevancies of the recommended items or sponsored items; and
  $\sigma$ is the deviation of the relevancies of the recommended items or sponsored items.

In some examples, item determination computing device 102 normalizes the cost-per-click scores of the sponsored items. For example, item determination computing device 102 may normalize the cost-per-click scores based on the equation below.

$$Z_{cpc}=(S_{cpc}-\mu)/\sigma \qquad (\text{eq. 2})$$

where:
  $S_{cpc}$ is the cost-per-click score for a sponsored item;
  $\mu$ is the mean (average) of the cost-per-click scores of the sponsored items; and
  $\sigma$ is the deviation of the cost-per-click scores of the sponsored items.

Item determination computing device 102 may generate final item scores for the sponsored items based on the normalized relevancies and cost-per-click scores. For example, item determination computing device 102 may generate final item scores for sponsored items based on the equation below.

$$Z_{final}=\beta*Z_{rel}+(1-\beta)*Z_{cpc} \qquad (\text{eq. 3})$$

where:
  $\beta$ is a coefficient that can be preconfigured.

Because, in some examples, the recommended items are not sponsored items, and therefore are not associated with a cost-to-click cost, item determination computing device 102 may generate final item scores for the recommended items based on just the normalized relevancies. For example, item determination computing device 102 may generate final item scores for the recommended items based on the equation below.

$$Z_{final} = \beta * Z_{rel} \qquad \text{(eq. 4)}$$

Item determination computing device 102 may then generate the ranked item list based on the final item scores for the recommended items and the sponsored items. For example, items with higher final item scores may be ranked ahead of items with lower final item scores. In some examples, item determination computing device 102 adjusts the ranked item list based on the application of one or more rules, as described further below.

Item determination computing device 102 may transmit the ranked item list to web server 104. Web server 104 may then display advertisements for the items on a webpage. In some examples, the ranked items are advertised on a webpage of an anchor item (e.g., the anchor item being the "main" item displayed on the webpage). For example, advertisements for the ranked items may be displayed as suggested additional items to be purchased along with the anchor item. In some examples, advertisements for the ranked items may be displayed on a webpage illustrating that the anchor item has been added to an online shopping cart (e.g., checkout webpage).

Figure 2:
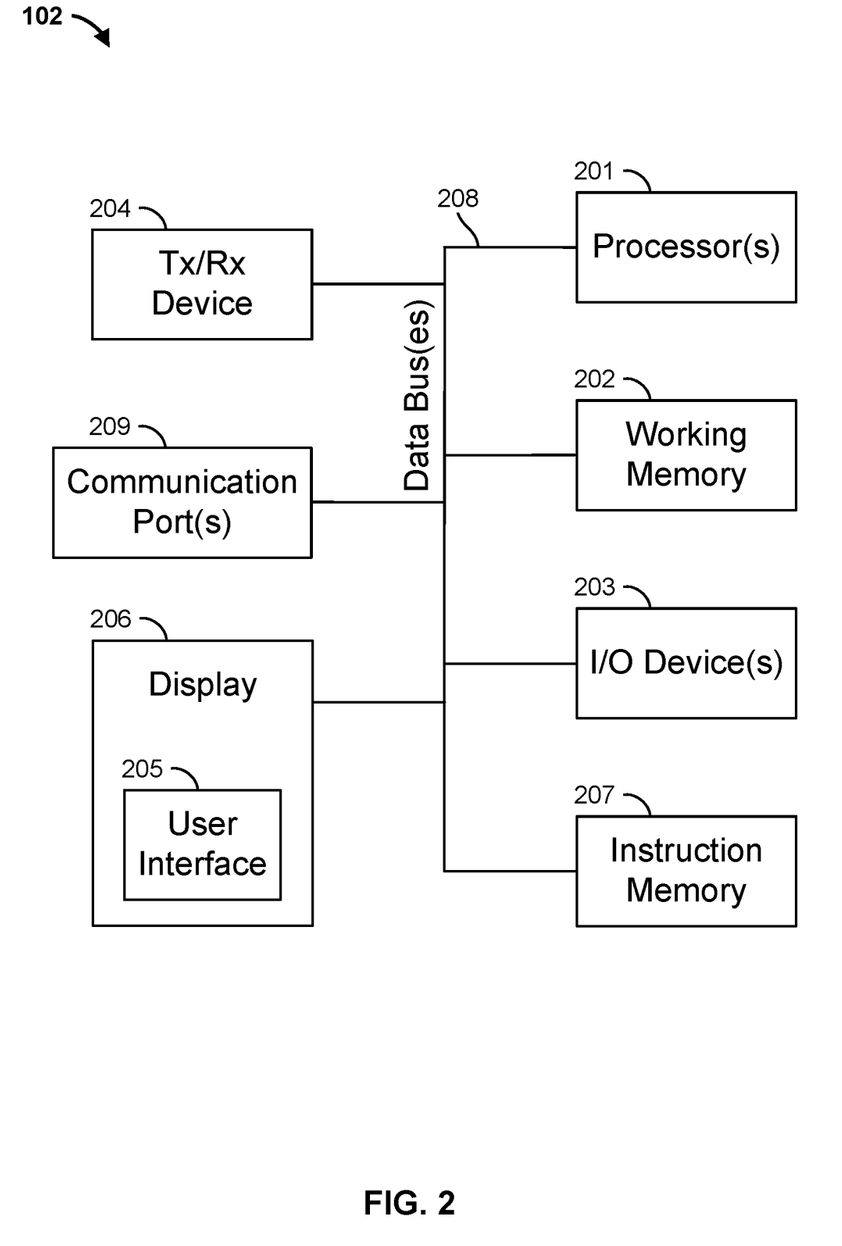
FIG. 2 is a block diagram of the item determination computing device of the item advertisement determination system of FIG. 1 in accordance with some embodiments.

FIG. 2 illustrates the item determination computing device 102 of FIG. 1. Item determination computing device 102 can include one or more processors 201, working memory 202, one or more input/output devices 203, instruction memory 207, a transceiver 204, one or more communication ports 209, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of item determination computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as sponsored item data identifying sponsored items.

Display 206 can display user interface 205. User interfaces 205 can enable user interaction with item determination computing device 102. For example, user interface 205 can be a user interface for an application of a retailer that allows a customer to view and interact with a retailer's webpage. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 item determination computing device 102 will be operating in. Processor(s) 201 is operable to receive data from, or send data to, a network, such as communication network 118 of FIG. 1, via transceiver 204.

Figure 3:
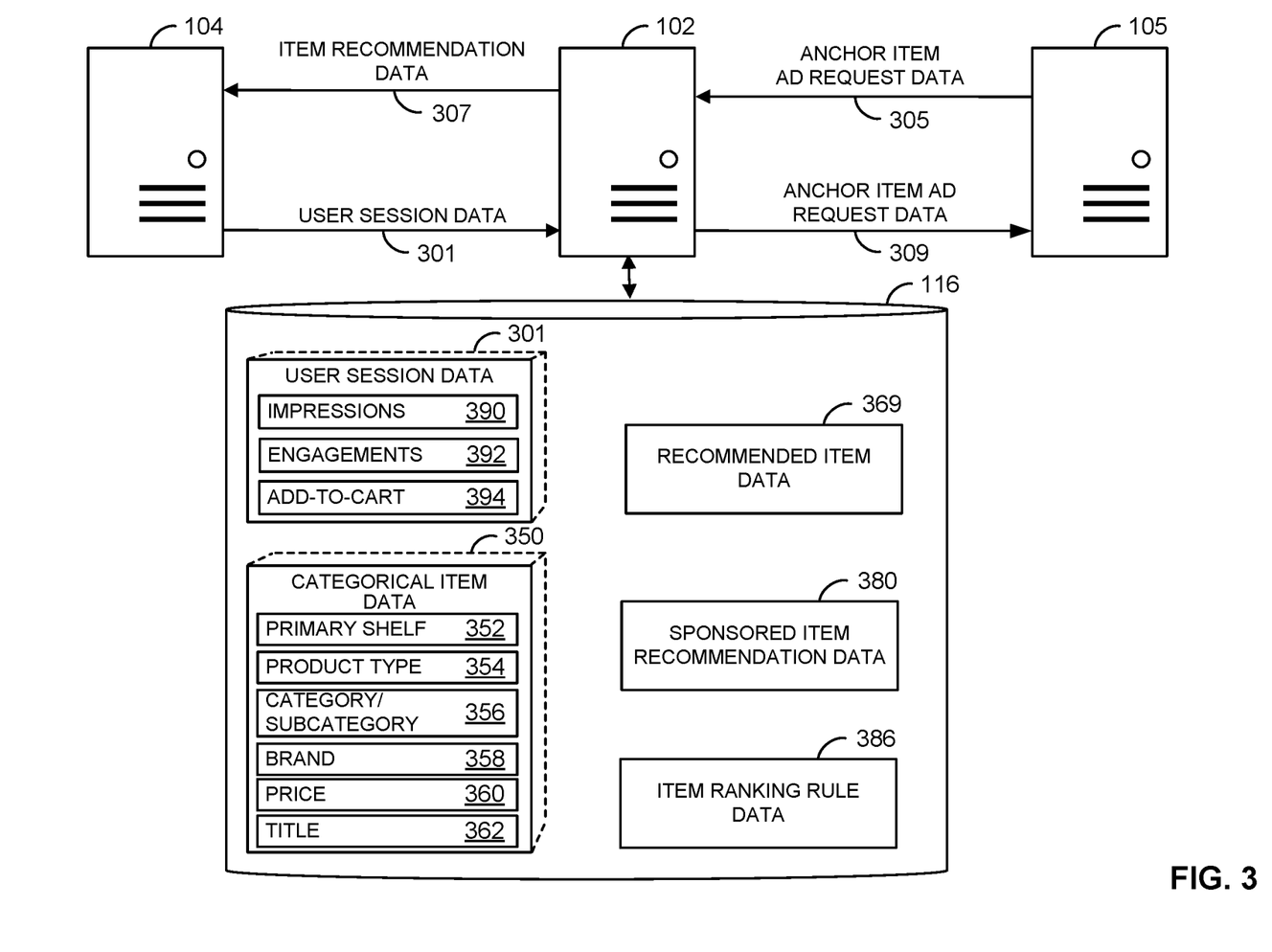
FIG. 3 is a block diagram illustrating examples of various portions of the item advertisement determination system of FIG. 1 in accordance with some embodiments.

FIG. 3 is a block diagram illustrating examples of various portions of the item advertisement determination system 100 of FIG. 1. As indicated in the figure, item determination computing device 102 may receive user session data 301 from web server 104. For example, web server 104 may transmit user session data 301 to item determination computing device 102 when a customer is browsing a webpage, such as an anchor webpage. User session data 301 may identify data associated with a browsing session of a customer. For example, user session data 301 may identify impressions 390 (e.g., item advertisements viewed), engagements 392 (e.g., item advertisements engaged), add-to-cart 394 (e.g., items added to online shopping carts), and any other data related to the browsing of a webpage. Item determination computing device 102 may store user session data 301 in database 116.

In response to receiving user session data 301, item determination computing device 102 may request and receive from item recommendation system 105 one or more recommended items for a given anchor item. For example, item determination computing device 102 may determine an anchor item based on user session data 301. Item recommendation system 105 may then generate and transmit to item recommendation system 105 anchor item advertisement request 309 requesting recommended items for the anchor item. In response, item recommendation system 105 transmits anchor item advertisement response data 305 identifying the recommended items for the anchor item. Item determination computing device 102 may generate and store recommended item data 369 identifying and characterizing the recommended items in database 116.

In this example, database 116 also stores sponsored item recommendation data 380, which identifies and characterizes sponsored items. Sponsored item recommendation data 380 may also identify a cost-per-click, such as an amount that a retailer receives for each click of an advertisement, for each sponsored item. In some examples, anchor item advertisement response data 305 includes one or more sponsored items.

Database 116 may also store categorical item data 350, which may identify attributes of each of a plurality of items, such as items sold on a retailer's website). For example, categorical item data 350 may include a primary shelf 352 for each item. The primary shelf of each item may be based on a taxonomical hierarchy that defines which category a product belongs to. For example, a primary shelf for brand "A" laptops may be: Electronics/Computers/Laptops/Brand A Laptops. Categorical item data 350 may also include a product type 354 of each item, a category and/or subcategory 356 of each item, a brand 358 of each item, and a price 360 of each item. Item determination computing device 102 may employ categorical item data 350 to determine a similarity between sponsored items and recommended items, for example.

In response to receiving user session data 301, item determination computing device 102 may determine one or more sponsored items identified by sponsored item recommendation data 380 that are most similar to recommended items identified by recommended item data 369. For example, item determination may determine a similarity between the sponsored items and the recommended items based on one or more of categorical item data 350, such as an item title 362, item category 356, and item price 360. Item determination computing device 102 may remove from consideration any sponsored items with a similarity below a threshold. The threshold may be preconfigured by the retailer (e.g., stored in database 116). Item determination computing device 102 may then determine a relevance score for the determined sponsored items, and for the recommended items. Further, item determination computing device 102 may normalize the relevancy scores for the sponsored items and the recommended items. Item determination computing device 102 may also normalize the cost-per-click values for the sponsored items. Item determination computing device 102 may then generate final item scores for the recommended items based on the corresponding normalized relevance scores, and may generate final item scores for the sponsored items based on the corresponding normalized relevance scores and normalized cost-per-click scores.

Item determination computing device 102 may generate a final ranking of recommended items based on the final item scores for the sponsored items and recommended items. The final ranking of recommended items may include "boosted" items, such as a recommended item for which an advertisement will now be displayed earlier than they otherwise would have been displayed. The final ranking of recommended items may also include "blended" items, such as sponsored items that are now part of the recommendations.

In some examples, after generating the final scores, item determination computing device 102 updates the final ranking of recommended items to ensure compliance with one or more "rules" (e.g., limits). The rules may be preconfigured, for example, by the retailer. As illustrated, database 116 stores item ranking rule data 386, which may identify and characterize or more rules. Item determination computing device 102 may obtain item ranking rule data 386 from database 116, and apply one or more of the identified rules to generate the final ranking.

As an example of a rule, one rule may not allow a sponsored item to appear until at least a number of recommended items have been displayed. For example, assume that the rule specifies that no sponsored items are to appear in a carousel until at least three recommended items have appeared. If a sponsored item is ranked such that it is second, for example, item determination computing device 102 can update the final ranking and place the sponsored item in a fourth position. As such, the sponsored item will not appear in a carousel into after the third recommended item.

As another example of a rule, a rule may specify that sponsored items may not appear a second time until at least a number of other recommended items or sponsored items have been displayed. In this case, item determination computing device 102 determines the last time the sponsored item was displayed, and, if necessary, updates the final ranking to either remove the sponsored item, or move it down the ranked list enough such that the rule is satisfied.

Item determination computing device 102 may generate item recommendation data 308 identifying the final recommended items, and may transmit item recommendation data 308 to web server 104. Web server 104 may display advertisements for the items identified by item recommendation data 308. For example, web server 104 may display the advertisements in a carousel of a webpage, such as on a webpage dedicated to the anchor item.

Figure 7:
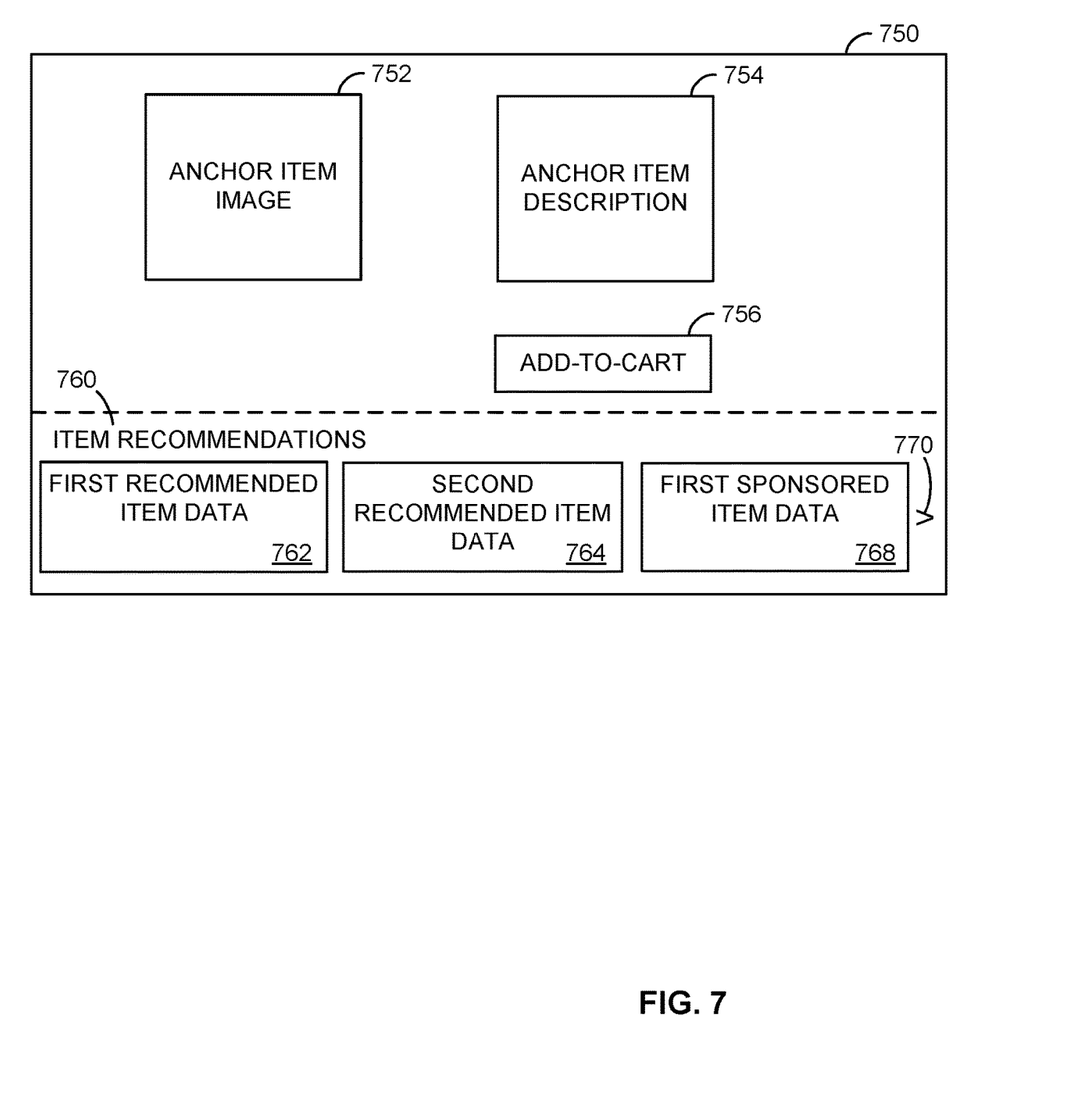
FIG. 7 is a block diagram of a webpage with advertisements for recommended items in accordance with some embodiments.

For example, FIG. 7 illustrates an anchor item webpage 750 that may be displayed by web server 104. Anchor item webpage 750 may include an anchor item image 752, which may be an image of the anchor item. Anchor item webpage 750 may also include an anchor item description 754, which may include text describing the anchor item or, for example, anchor item options. Anchor item webpage 750 may also include add-to-cart icon 756. By engaging (e.g., clicking) add-to-cart icon 756, a customer may add the anchor item to an online shopping cart. As such, by performing a "checkout" of the online shopping cart, the customer may purchase the anchor item.

Anchor item webpage 750 also include a carousel 760 that displays recommended items. Assume, for this example, that item recommendation data 308 identifies, in order (e.g., by score or value, position in a list, etc.), a first recommended item, a second recommended item, a first sponsored item, and additional recommended items. Web server 104 causes carousel 760 to display, in order, first recommended item data 762, second recommended item 764, and first sponsored item data 768. First recommended item data 762 may be an advertisement for the first item identified by item recommendation data 308. First recommended item data 762 may include, for example, an image of the first recommended item, and a link to a webpage dedicated to the first recommended item. Similarly, second recommended item data 764 may be an advertisement for the second item identified by item recommendation data 308. First sponsored item data 768 may be an advertisement for the third item, but first sponsored item, identified by item recommendation data 308. In one example, item determination computing device 102 may have generated a higher score for the first sponsored item compared to the first recommended item and the second recommended item, but moved it down in the ranking based on application of a rule requiring no sponsored items to appear in the first two recommendation positions. A customer may view additional recommended items by engaging continue icon 770, which causes the carousel 760 to display the next recommended items.

Figure 4:
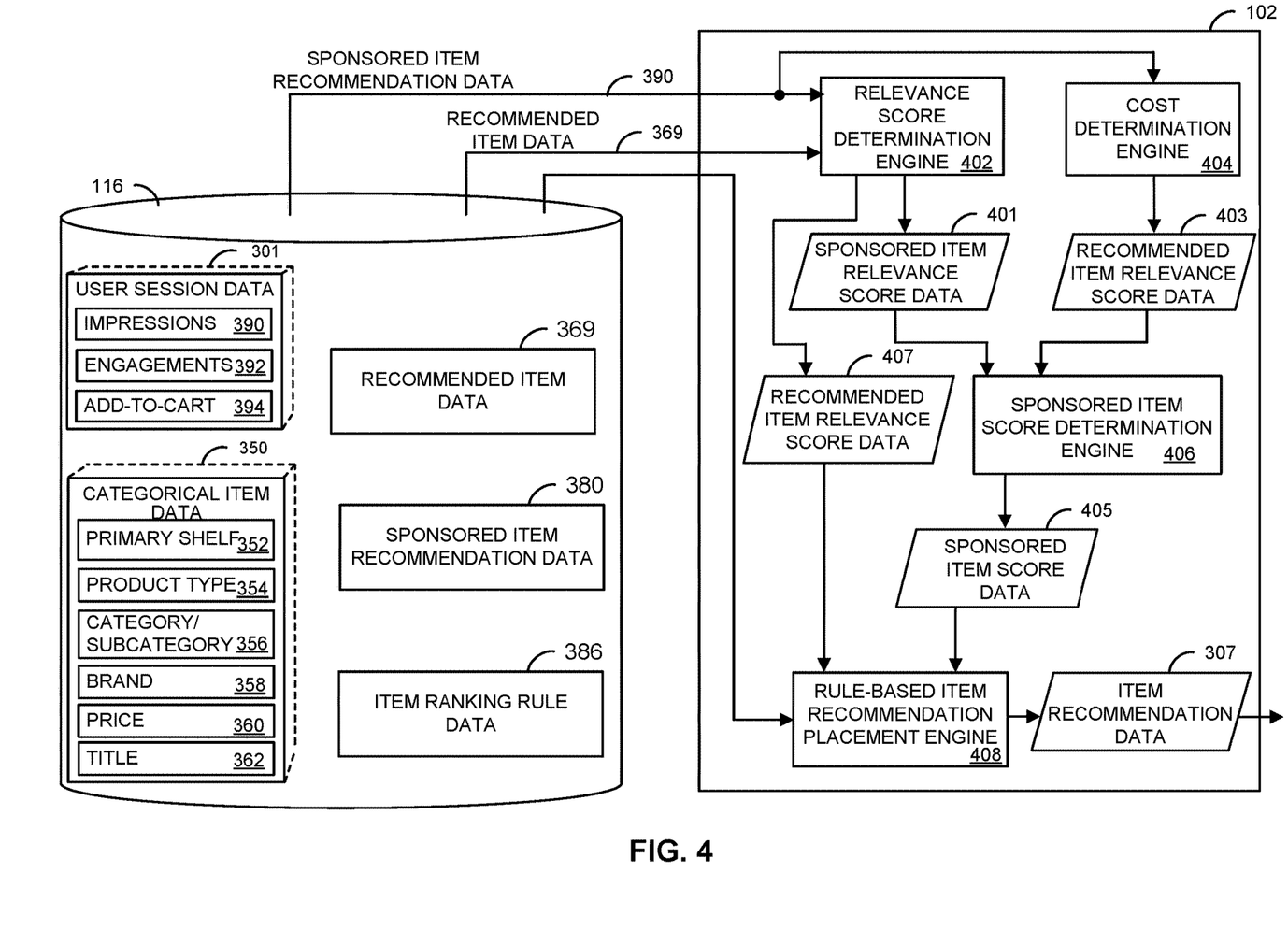
FIG. 4 is another block diagram illustrating examples of various portions of the item advertisement determination system of FIG. 1 in accordance with some embodiments.

FIG. 4 is a block diagram illustrating more details of the item determination computing device 102 of FIG. 2. In this example, item determination computing device 102 includes relevance score determination engine 402, cost determination engine 404, sponsored item score determination engine 406, and rule-based item recommendation placement engine 408. In some examples, one or more of includes relevance score determination engine 402, cost determination engine 404, sponsored item score determination engine 406, and rule-based item recommendation placement engine 408 may be implemented in hardware. In some examples, one or more of includes relevance score determination engine 402, cost determination engine 404, sponsored item score determination engine 406, and rule-based item recommendation placement engine 408 may be implemented may be implemented as an executable program maintained in a tangible, non-transitory memory, such as instruction memory 207 of FIG. 2, which may be executed by one or processors, such as processor 201 of FIG. 2.

Relevance score determination engine 402 is operable to obtain recommended item data 369, which identifies recommended items, from database 116, and generates relevancy scores for each recommended item. In some examples, relevance score determination engine 402 normalizes the relevancies. For example, relevance score determination engine 402 may generate the relevancy scores based on equation (1) above. Relevance score determination engine 402 may then generate final item scores for the recommended items. For example, relevance score determination engine 402 may generate the final item scores based on equation (4) above. Relevance score determination engine 402 generates recommended item relevance score data 407 identifying the final item scores for the recommended items.

Relevance score determination engine 402 is also operable to obtain sponsored item recommendation data 390, which identifies sponsored items, from database 116, and generate sponsored item relevance score data 401 identifying relevancy scores for each sponsored item. In some examples, relevance score determination engine 402 normalizes the relevancies. For example, relevance score determination engine 402 may normalize the relevancies based on a mean and deviation of the relevance of the sponsored items. In some examples, relevance score determination engine 402 filters out sponsored items based on a type or category of each sponsored item and the type or category of the anchor item. For example, relevance score determination engine 402 may remove from consideration sponsored items that do not have a same category or type as the anchor item.

Cost determination engine 404 is operable to obtain sponsored item recommendation data 390, and extract a cost-per-click value for each sponsored item. Cost determination engine 404 may determine a cost-per-click score for each sponsored item based at least on each sponsored item's corresponding cost-per-click value. In some examples, cost determination engine 404 normalizes the cost-per-click scores. For example, cost determination engine 404 may normalize the cost-per-click scores based on equation (2) above. Cost determination engine 404 may generate sponsored item cost data 403 identifying the cost-per-click scores for the sponsored items.

Sponsored item score determination engine 406 receives sponsored item relevance score data 401 and sponsored item cost data 403, and determines a final item score for each sponsored item. For example, sponsored item score determination engine 406 may generate final item scores for sponsored items based on equation (3) described above. Sponsored item score determination engine 406 generates sponsored item score data 405 identifying the final item scores for the sponsored items.

Rule-based item recommendation placement engine 408 receives recommended item relevance score data 407 and sponsored item score data 405, and generates a ranking of the recommended items and sponsored items based on the identified scores. For example, rule-based item recommendation placement engine 408 may generate a vector identifying the recommended items and sponsored items, where items with higher scores are positioned in the vector before items with lower scores. For example, an item at the first element of the vector may be associated with a higher score than an item at the second element of the vector.

Rule-based item recommendation placement engine 408 may also update (e.g., rearrange) the ranking of the recommended items and sponsored items based on applying one or more rules. For example, rule-based item recommendation placement engine 408 may obtain item ranking rule data 386 from database 116, and apply one or more of the identified rules to the ranking to generate a final item ranking. Rule-based item recommendation placement engine 408 generates item recommendation data 307 identifying the final item ranking. Item determination computing device 102 may transmit item recommendation data 307 to, for example, web server 104.

Web server 104 may receive item recommendation data 307 and display advertisements for the items in an order that is based on the final ranking. For example, web server 104 may display an advertisement in a carousel, such as carousel 760, for a first item that has a higher ranking before (e.g., earlier in the carousel, such as at position indicated by first recommended item data 762) displaying an advertisement for a second item that has a relatively lower ranking (e.g., later in the carousel, such as at position indicated by second recommended item data 764).

Figure 5:
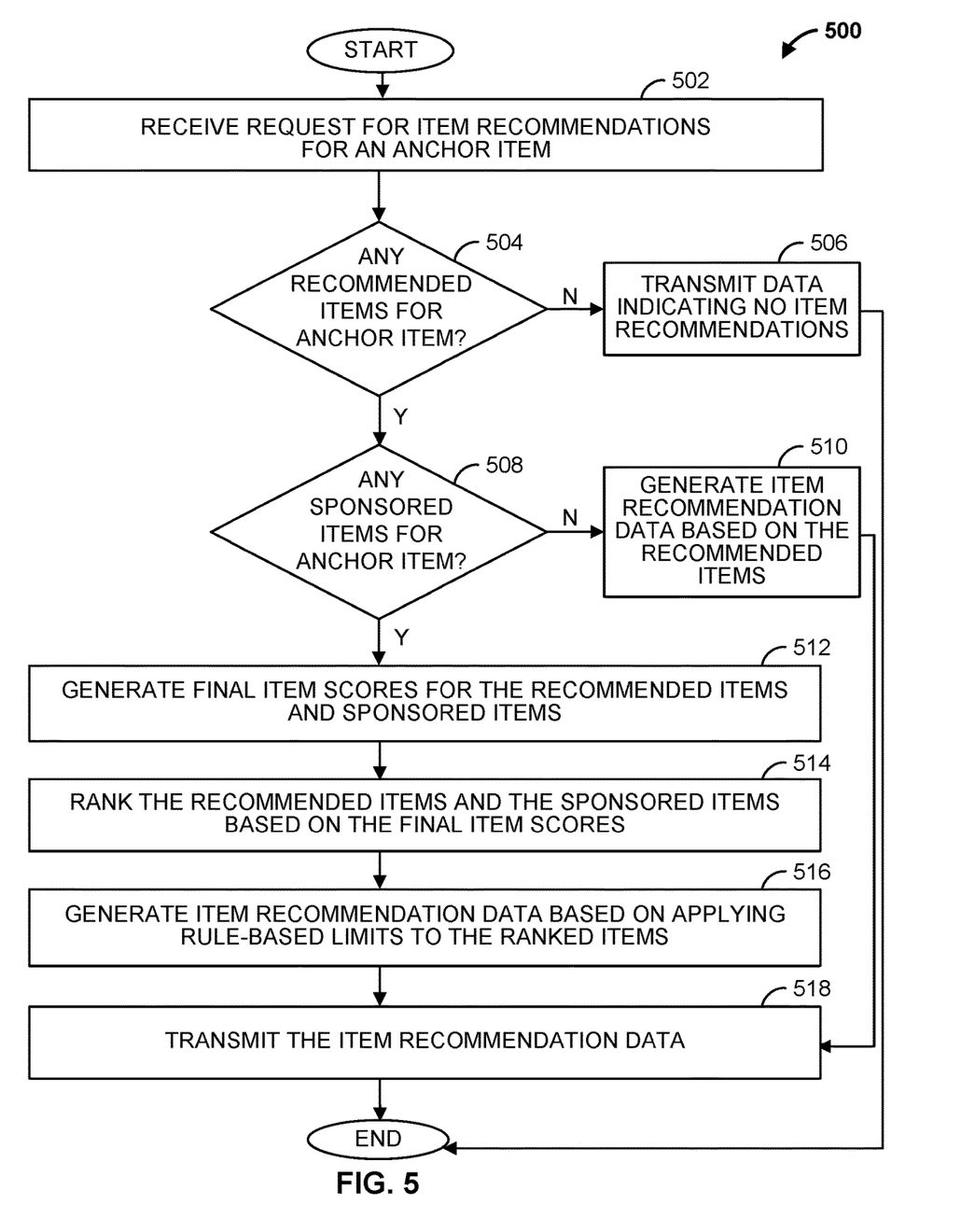
FIG. 5 is a flowchart of an example method that can be carried out by the item determination computing device of FIG. 2 in accordance with some embodiments.

FIG. 5 is a flowchart of an example 500 that can be carried out by the item advertisement determination system 100 of FIG. 1. Beginning at step 502, a request for item recommendations for an anchor item is received. For example, item determination computing device 102 may receive a request from web server 104 for recommended items to advertise for an anchor item. Web server 104 may display the advertisements, for example, in a carousel on a webpage for the anchor item. At step 504, a determination is made as to whether there are any recommended items for the anchor item. If there are none, the method proceeds to step 506, where data is transmitted indicating there are no recommended items to advertise. The method then ends.

If, however, there is at least one recommended item, the method proceeds to step 508. At step 508, a determination is made as to whether there are any sponsored items for the anchor item. For example, item determination computing device 102 may obtain sponsored item recommendation data 380 from database 116 to determine if there are any sponsored items available. In some examples, there may be no sponsored items available if, for example, a contract period between the advertisers and the retailer has expired. In some examples, although there may be one or more sponsored items available, item determination computing device 102 determines their relevancy to the anchor item. For example, item determination computing device 102 may determine if any of the sponsored items are of the same product type as the anchor item. Item determination computing device 102 determines there are sponsored items for the anchor item only if there are any sponsored items of the same product type as the anchor item.

If there are no sponsored items for the anchor item, the method proceeds to step 510, where item recommendation data is generated. The item recommendation data is based on the recommended items determined at step 504. The method then proceeds to step 518, where the item recommendation data is transmitted. For example, item determination computing device 102 may transmit the item recommendation data to web server 104. If, however, at step 508 there are sponsored items for the anchor item, the method proceeds to step 512.

At step 512, final item scores are generated for the recommended items and for the sponsored items. For example, item determination computing device 102 may determine a normalized relevancy score for each of the recommended items and sponsored items, and may determine a normalized cost-per-click score for the sponsored items. Item determination computing device 102 may then compute a final item score for each recommended item based on the corresponding normalized relevancy score for each recommended item. Item determination computing device 102 may also compute a final item score for each sponsored item based on the corresponding normalized relevancy score and normalized cost-per-click score for each sponsored item.

Proceeding to step 514, the recommended items and the sponsored items are ranked based on the final item scores. For example, item determination computing device 102 may generate a ranked list of the recommended items and the sponsored items based on the final item scores. Items with a higher final item score may appear earlier in the list, while items with a lower final item score may appear later in the list, for example. The method then proceeds to step 516.

At step 516, item recommendation data is generated based on applying rule-based limits to the ranked items. For example, item determination computing device 102 may move a sponsored item up or down the ranking if there is a violation of a rule. Item determination computing device 102 then generates item recommendation data identifying a final ranked list of items. The method proceeds to step 518, where the item recommendation data is transmitted. For example, item determination computing device 102 may transmit the item recommendation data to web server 104. The method then ends.

Figure 6:
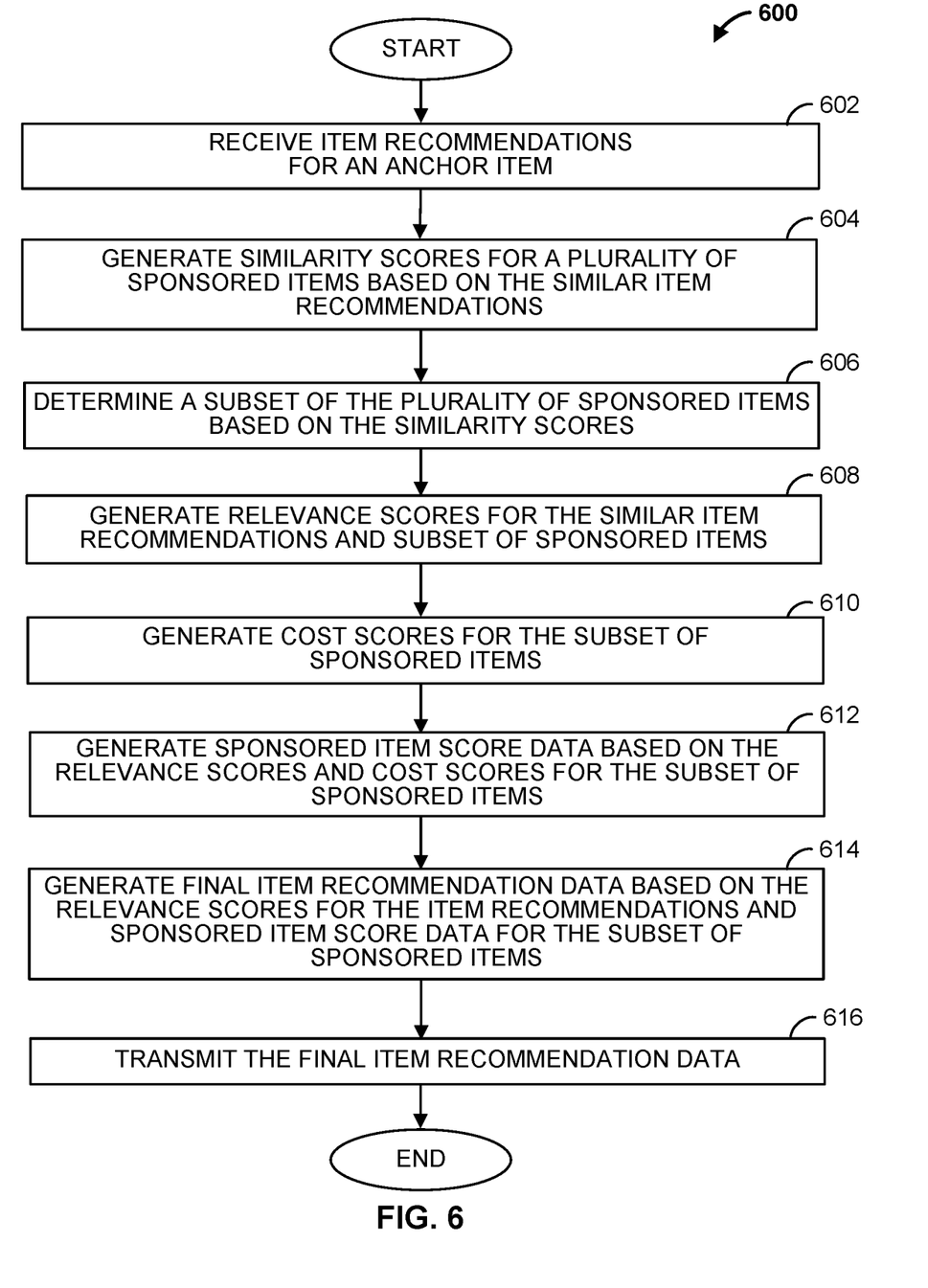
FIG. 6 is a flowchart of another example method that can be carried out by the item determination computing device of FIG. 2 in accordance with some embodiments.

FIG. 6 is a flowchart of an example method 600 that can be carried out by the item advertisement determination system 100 of FIG. 1. At step 602, item recommendations are received for an anchor item. For example, item determination computing device 102 may receive item recommendations for an anchor item from item recommendation system 105. At step 604, similarity scores are generated for a plurality of sponsored items based on the item recommendations. For example, item determination computing device 102 may obtain sponsored item recommendation data 380 from database 116, and, for each sponsored item, generate at least one similarity score. The similarity score may be a cosine similarity score based on a title, category, and price (e.g., vector representing the title, category, and price) between the sponsored item and a recommended item. In some examples, item determination computing device 102 generates a similarity score between each sponsored item and recommended item, and determines the highest similarity score for each sponsored item.

Proceeding to step 606, a subset of the plurality of sponsored items is determined based on the similarity scores. For example, item determination computing device 102 may keep only those sponsored items with a similarity score beyond (e.g., above) a threshold. Sponsored items with similarity scores that are not beyond (e.g., at or below) the threshold may be removed (e.g., discarded) from consideration.

At step 608, relevance scores for the recommended items, and the subset of sponsored items, is determined. In some examples, the relevance scores for the subset of sponsored items may be based on the similarity scores determined at step 604. In some examples, the relevance scores for the recommended items are normalized based on a mean and deviation of the relevance of the recommended items. In some examples, the relevance scores for the sponsored items are normalized based on a mean and deviation of the relevance of the sponsored items.

The method then proceeds to step 610, where cost scores are generated for the subset of sponsored items. The cost scores may be based on, for example, cost-per-click values. For example, a sponsored item with a higher cost-per-click value (e.g., amount advertiser will pay the retailer for each click of an advertisement for the sponsored item) may receive a higher cost score than a sponsored item with a lower cost-per-click value. In some examples, the cost scores are normalized based on a mean and deviation of the cost scores of the sponsored items. At step 612, sponsored item score data is generated based on the relevance scores and cost scores for the subset of sponsored items.

Proceeding to step 614, final item recommendation data is generated based on the relevance scores for the item recommendations and the sponsored item score data for the subset of sponsored items. For example, item determination computing device 102 may generate a ranked list of final recommended items, where the recommended items and sponsored items are ranked based on their corresponding relevance scores and sponsored item scores, respectively. In some examples, item determination computing device 102 updates the ranked list based on one or more rules. For example, item determination computing device 102 may increase, or decrease, the ranking of a sponsored item based on the application of a rule.

The method then proceeds to step 616, where the final item recommendation data is transmitted. For example, item determination computing device 102 may transmit the final item recommendation data to web server 104. Web server 104 may then display advertisements for the items identified by the final item recommendation data in a carousel of a webpage. The advertisements may be displayed in an order that is in accordance with the ranking of the recommended items and sponsored items. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
    a computing device configured to:
       determine, based on browsing session data, an anchor item;
       determine a first relevance value for at least one recommended item based on a relevancy to the anchor item;
       determine a similarity value for at least one sponsored item based on a similarity of attributes between the at least one sponsored item and the anchor item;
       determine a second relevance value for the at least one sponsored item based on a relevancy to the anchor item and the similarity value;
       determine a ranking of the at least one recommended item and the at least one sponsored item based on the first relevance value and the second relevance value; and
       provide for display an item advertisement of the at least one recommended item and the at least one sponsored item based on the ranking.

2. The system of claim 1, wherein determining the ranking of the at least one recommended item and the at least one sponsored item comprises determining that an advertisement for any of the at least one sponsored item cannot be displayed until at least a predetermined number of recommended items have been displayed.

3. The system of claim 1, wherein determining the ranking of the at least one recommended item and the at least one sponsored item comprises determining that a subsequent advertisement for any of the at least one sponsored item cannot be displayed until at least a predetermined number of a total of recommended items and other sponsored items have been displayed.

4. The system of claim 1, wherein determining the ranking of the at least one recommended item and the at least one sponsored item comprises generating a vector identifying the at least one recommended item and the at least one sponsored item ordered according to the first relevance value and the second relevance value.

5. The system of claim 1, wherein the browsing session data is associated with a particular user, and the item advertisement of the at least one recommended item and the at least one sponsored item is displayed, based on the ranking, to the particular user.

6. The system of claim 1, wherein the computing device is configured to:
    determine a cost value for each of the at least one sponsored item; and
    determine the ranking based on the cost value for each of the at least one sponsored item.

7. The system of claim 6, wherein the cost value for each of the at least one sponsored item is a cost-per-click value.

8. The system of claim 1, wherein the computing device is configured to:
    normalize the first relevance value for each of the at least one recommended item;
    normalize the second relevance value for each of the at least one sponsored item; and
    determine the ranking of the at least one recommended item and the at least one sponsored item based on the normalized first relevance values and the normalized second relevance values.

9. The system of claim 8, wherein normalizing the first relevance value for each of the at least one recommended item comprises:
    determining a mean of the first relevance values;
    determining a deviation of the first relevance values; and
    normalizing the first relevance values based on the mean and the deviation.

10. The system of claim 8, wherein normalizing the second relevance value for each of the at least one sponsored item comprises:
    determining a mean of the second relevance values;
    determining a deviation of the second relevance values; and
    normalizing the second relevance values based on the mean and the deviation.

11. The system of claim 1, wherein the computing device is configured to transmit the item advertisement of the at least one recommended item and the at least one sponsored item based on the ranking to a web server.

12. The system of claim 1, wherein the computing device is configured to determine that the similarity value for the at least one sponsored item is beyond a threshold.

13. A method comprising:
    determining, based on browsing session data, an anchor item;
    determining a first relevance value for at least one recommended item based on a relevancy to the anchor item;
    determining a similarity value for at least one sponsored item based on a similarity of attributes between the at least one sponsored item and the anchor item;
    determining a second relevance value for the at least one sponsored item based on a relevancy to the anchor item and the similarity value;
    determining a ranking of the at least one recommended item and the at least one sponsored item based on the first relevance value and the second relevance value; and
    providing for display an item advertisement of the at least one recommended item and the at least one sponsored item based on the ranking.

14. The method of claim 13, wherein determining the ranking of the at least one recommended item and the at least one sponsored item comprises determining that an advertisement for any of the at least one sponsored item cannot be displayed until at least a predetermined number of recommended items have been displayed.

15. The method of claim 13, wherein determining the ranking of the at least one recommended item and the at least one sponsored item comprises determining that a subsequent advertisement for any of the at least one sponsored item cannot be displayed until at least a predetermined number of a total of recommended items and other sponsored items have been displayed.

16. The method of claim 13, wherein determining the ranking of the at least one recommended item and the at least one sponsored item comprises generating a vector identifying the at least one recommended item and the at least one sponsored item ordered according to the first relevance value and the second relevance value.

17. The method of claim 13 comprising:
   determining a cost value for each of the at least one sponsored item; and
   determining the ranking based on the cost value for each of the at least one sponsored item.

18. A non-transitory computer readable medium having instructions stored thereon, wherein the instructions, when executed by at least one processor, cause a device to perform operations comprising:
   determining, based on browsing session data, an anchor item;
   determining a first relevance value for at least one recommended item based on a relevancy to the anchor item;
   determining a similarity value for at least one sponsored item based on a similarity of attributes between the at least one sponsored item and the anchor item;
   determining a second relevance value for the at least one sponsored item based on a relevancy to the anchor item and the similarity value;
   determining a ranking of the at least one recommended item and the at least one sponsored item based on the first relevance value and the second relevance value; and
   providing for display an item advertisement of the at least one recommended item and the at least one sponsored item based on the ranking.

19. The non-transitory computer readable medium of claim 16 wherein the instructions, when executed by the at least one processor, cause the device to perform operations comprising:
   determining that an advertisement for any of the at least one sponsored item cannot be displayed until at least a predetermined number of recommended items have been displayed.

20. The non-transitory computer readable medium of claim 16 wherein the instructions, when executed by the at least one processor, cause the device to perform operations comprising:
   determining that a subsequent advertisement for any of the at least one sponsored item cannot be displayed until at least a predetermined number of a total of recommended items and other sponsored items have been displayed.

* * * * *